US012752777B2

(12) United States Patent
Gopalakrishnan

(10) Patent No.: US 12,752,777 B2
(45) Date of Patent: Oct. 6, 2026

(54) DRIVER HEALTH MONITOR AND ALERT SYSTEM

(71) Applicant: FCA US LLC, Auburn Hills, MI (US)

(72) Inventor: Gomathi Gopalakrishnan, Thoraipakkam (IN)

(73) Assignee: FCA US LLC, Auburn Hills, MI (US)

( * ) Notice: Subject to any disclaimer, the term of this patent is extended or adjusted under 35 U.S.C. 154(b) by 54 days.

(21) Appl. No.: 18/918,259

(22) Filed: Oct. 17, 2024

(65) Prior Publication Data

US 2026/0109344 A1 Apr. 23, 2026

(51) Int. Cl.

*B60W 30/09* (2012.01)
*B60Q 1/50* (2006.01)
*B60Q 3/70* (2017.01)
*B60Q 5/00* (2006.01)
*B60W 10/18* (2012.01)
*B60W 10/20* (2006.01)
*B60W 50/14* (2020.01)

(52) U.S. Cl.

CPC ............. *B60W 30/09* (2013.01); *B60Q 1/544* (2022.05); *B60Q 3/70* (2017.02); *B60Q 5/005* (2013.01); *B60W 10/18* (2013.01); *B60W 10/20* (2013.01); *B60W 50/14* (2013.01); *B60W 2540/10* (2013.01); *B60W 2540/221* (2020.02)

(58) Field of Classification Search

CPC ........................ B60W 2540/221; B60W 30/09
See application file for complete search history.

(56) References Cited

U.S. PATENT DOCUMENTS 9,751,534 B2 * 9/2017 Fung ...................... G06V 10/82
10,238,304 B2 * 3/2019 Fung ...................... A61B 5/024
10,246,098 B2 * 4/2019 Fung ...................... G06V 10/82
11,232,313 B2 * 1/2022 Kanda .................. G06V 40/174
11,474,041 B2 * 10/2022 Richmond ............. G01N 21/01
12,159,241 B2 * 12/2024 Coles ................... A61B 5/1171
2014/0276090 A1 * 9/2014 Breed ................. A61B 5/1455
600/473

(Continued)

OTHER PUBLICATIONS

Reyes~Munoz, Angelica, et al.; Integration of Body Sensor Networks and Vehicular Ad-hoc Networks for Traffic Safety; Jan. 15, 2016 (29 pages).

(Continued)

*Primary Examiner* — Long T Tran
(74) *Attorney, Agent, or Firm* — Jeremy J. Klobucar

(57) ABSTRACT

A vehicle driver health monitor alert system includes a near infrared sensors and camera for detecting the position of a driver's eyes and head, as well as detecting the size and position of a driver's pupils which may indicate a health anomaly such as a seizure. The system may also include a galvanic skin response sensor which may also detect health anomaly such as a seizure. Other sensors such as electrocardiogram sensors and ultra-wide bandwidth units may be used to detect health anomalies such as cardiac attack, or breathing irregularities. Upon detection of a health anomaly, the system may initiate an Ecall, sound the vehicle's horn and turn on the emergency flashers and may also perform a minimum risk maneuver to bring the vehicle to a safe stop, by engaging the vehicle braking and steering systems.

16 Claims, 3 Drawing Sheets

(56) References Cited

U.S. PATENT DOCUMENTS

| | | | | |
|---|---|---|---|---|
| 2016/0001781 | A1 * | 1/2016 | Fung | G06V 10/82 701/36 |
| 2020/0310528 | A1 * | 10/2020 | Upmanue | A61B 5/4803 |
| 2024/0149884 | A1 * | 5/2024 | Barcia | B60W 30/10 |
| 2024/0149885 | A1 * | 5/2024 | Barcia | B60W 50/14 |
| 2024/0153380 | A1 * | 5/2024 | Barcia | G08G 1/166 |
| 2024/0155320 | A1 * | 5/2024 | Barcia | H04W 4/90 |

OTHER PUBLICATIONS

Efy, Bureau; Enhancing Vehicle Safety Through Integrated Drive Wellness Management; Feb. 21, 2017 (8 pages).
Kundinger, Thomas, et al.; A Robust Drowsiness Detection Method based on Vehicle and Driver Vital Data; 2017 (8 pages).
Yang, Zhicheng, et al.; Contactless Breathing Rate Monitoring in Vehicle Using UWB Radar; Nov. 4, 2018 (7 pages).
Dischinger, Patricia C., et al.; Medical Conditions and Car Crashes; 2000 (13 pages).
Wang, Ju, et al.; Unobtrusive Health Monitoring in Private Spaces: The Smart Vehicle; Apr. 25, 2020 (17 pages).

* cited by examiner

DRIVER HEALTH MONITOR AND ALERT SYSTEM

FIELD

The present disclosure relates to a vehicle driver health monitor and alert system.

BACKGROUND

Vehicle accidents are sometimes caused by the incapacity of a driver due to a health issue. When a driver is incapacitated by a health issue, the driver may lose control of the vehicle that could lead to a collision with other vehicles or other users of the road. This sometimes results in injuries and fatalities to the driver, the vehicle occupants, or pedestrians. It may be desirable to provide a system and method that reduces the risk of injury in the event of the incapacitation of the vehicle's driver.

SUMMARY

In at least some implementations there is provided a vehicle driver health monitor alert system comprising a light source configured to direct light to at least one of a driver's eyes or a driver's head. The system further comprises a camera configured to detect reflected light from a driver's eyes or a driver's head and further configured to generate a signal indicative of the position of at least one of a driver's pupil size, eye position or head position. The system further comprises a processor configured to receive the signal from the camera and make a determination regarding the position of at least one of a driver's pupil size, eye position or head position to make a determination of the health status of a driver, wherein the processor is configured to, upon a determination of an anomaly in a driver's health status, generate a signal to prompt the user to respond if no response received within certain duration, the system shall, initiate an emergency alert call to rescue the driver, sound a vehicle's horn, engage a vehicle's hazard lights to alert other traffic occupants, and perform a minimum risk maneuver to reach a safe stop.

In at least some implementations, there is provided a method of monitoring a vehicle driver's health and providing an alert comprising monitoring at least one of a driver's pupil size, a driver's eye position, or a driver's head position using a light source and a camera and providing a signal indicative of at least one of the driver's pupil size, the driver's eye position, or the driver's head position from the camera to a processor. The method further comprises determining the health status of the vehicle driver, and generating a signal indicative of the vehicle driver's health. The method further comprises sending a signal to a human machine interface indicative of an anomaly of the vehicle driver's health. The method further comprises upon detection of an anomaly in a driver's health status, generating signal to perform one or more of the following tasks; initiate an emergency alert call, sound a vehicle's horn, engage a vehicle's hazard lights, or perform a minimum risk maneuver.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
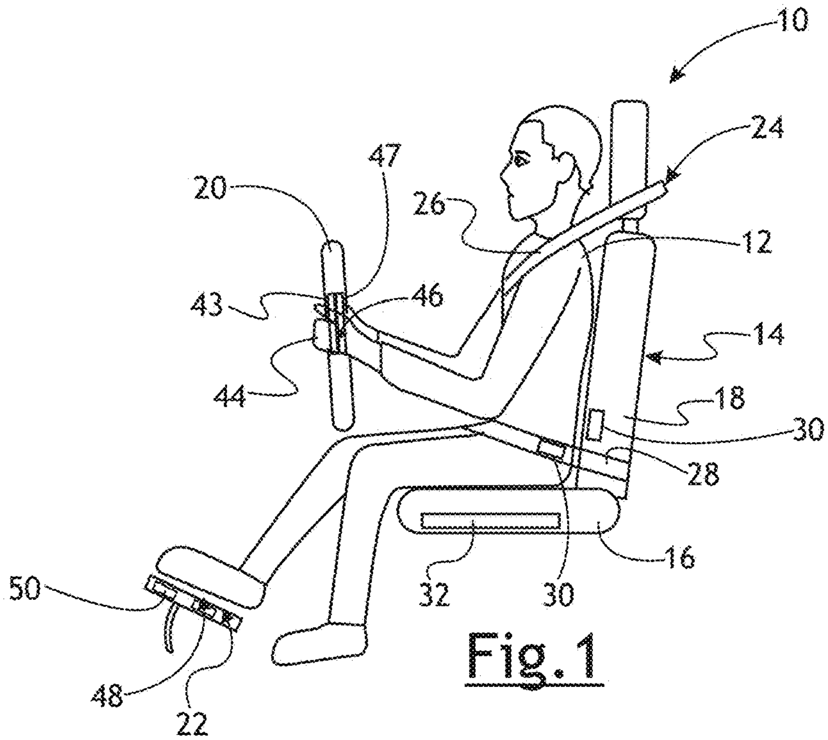
FIG. 1 is a schematic side view of a vehicle driver in a seat showing a steering wheel and an accelerator pedal of the vehicle.

Referring in more detail to the drawings, FIG. 1 generally shows components of a vehicle driver health monitor alert system at 10. In FIG. 1, a vehicle driver 12 is shown seated on a vehicle seat 14 having a seat bottom 16 and a seat back 18. The vehicle driver 12 is constrained by a seat belt system 24 having a shoulder belt 26 and a lap belt 28. The vehicle driver 12 is shown grasping a steering wheel 20 and also with a foot contacting an accelerator pedal 22.

When the vehicle driver 12 is seated, the driver's back typically contacts the seat back 18 and the driver also contacts the seat bottom 16. Further, the lap belt 28 is typically disposed over the driver's waist or lap and the shoulder belt 26 is placed over the driver's shoulder and across their chest, as shown. The system 10 may include one or more electrocardiogram, or ECG sensors 30. For example, the seat 14 or seat belt system 24 may contain an ECG sensor 30. As shown in FIG. 1, an ECG sensor 30 may be located in the seat back 18, or in the lap belt 28. An ECG sensor ground 32 may be located in the seat bottom 16. ECG sensors 30 and sensor ground 32 are used to monitor the electric activity of a driver's heart, which may include the hearth rhythm of the vehicle driver 12. Cardiac rhythm disturbances may be detected by the ECG sensors 30 and ECG sensor ground 32. A disturbance in the vehicle driver's cardiac rhythm may be in indicative of an abnormality which in some instances may incapacitate the vehicle driver 12. It will be appreciated that the ECG sensors 30 and ECG sensor ground 32 may be disposed in other suitable locations, for example, the vehicle steering wheel 20, but should be positioned in such a manner to monitor the electrical activity of the vehicle driver's heart. Further, it will be appreciated that the words abnormality and anomaly may be used interchangeably herein. The ECG sensors 30, including the ECG ground 32 are coupled with a processor 54. The ECG sensors 30, including the ECG ground 32 create a signal indicative of the cardiac rhythm of the vehicle driver 12. The signal is provided to the processor 54.

Figure 2:
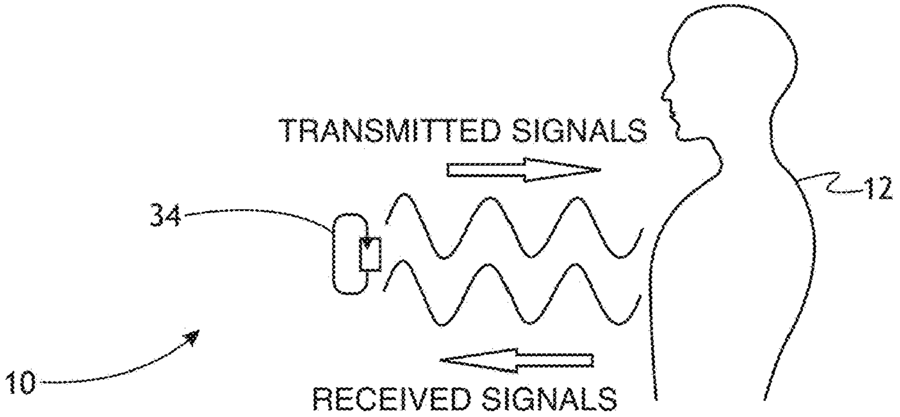
FIG. 2 is a schematic side view of a vehicle driver and showing a UWB radar.

FIG. 2 schematically shows a vehicle driver 12 and an ultra-wide band radar (UWB) unit 34. The UWB unit 34 may be positioned on the front side of the driver's seat close to the back of the driver. It will be appreciated that the UWB unit may be positioned in any suitable location. The UWB unit 34 includes a UWB source which may be directed at the vehicle driver 12. Specifically, the UWB source produces ultrawideband pulses directed at the vehicle driver 12 as labeled "transmitted signals" in FIG. 2. In an implementation, the ultrawideband pulses are directed at the vehicle driver's chest. A reflection of the pulses from the vehicle driver 12, labeled "received signals" in FIG. 2 is also received by the UWB unit 34. The UWB unit 34 may be used to detect minute chest movements which resulting from breathing activity of the vehicle driver 12. That is, the reflective pulse or signal from the vehicle driver 12, is indicative of the breathing activity of the vehicle driver 12. A disturbance in the vehicle driver's breathing activity may be in indicative of an abnormality which in some instances may incapacitate the vehicle driver 12. The UWB unit 34 generates a signal indicative of the vehicle user's breathing. It will be appreciated that the UWB unit 34 may be located in any suitable location of a vehicle but should be positioned to allow the monitoring of the breathing activity of the vehicle driver 12. The UWB unit 34 is coupled with a processor 54. The UWB unit 34 creates a signal indicative of the breathing of the vehicle driver 12. The signal is provided to the processor 54.

Figure 3:
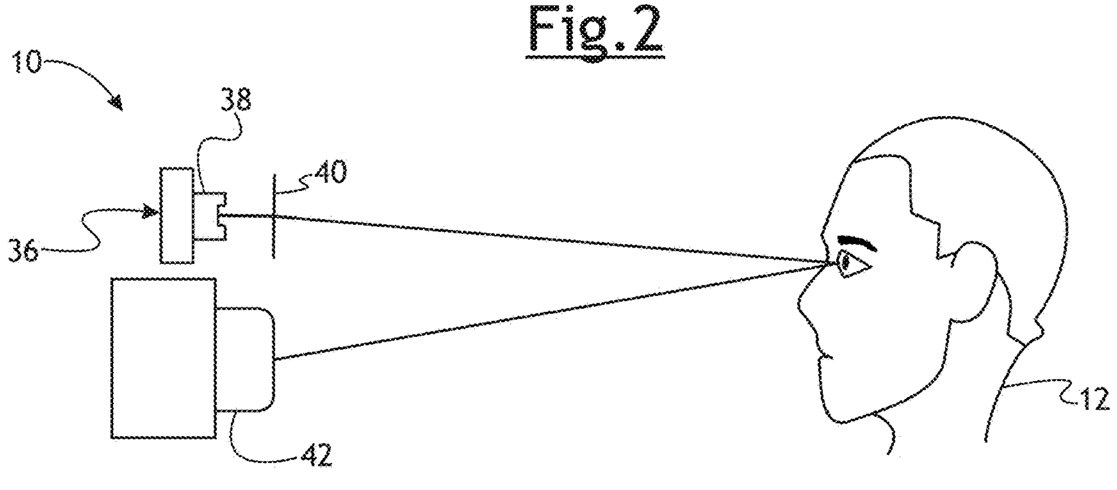
FIG. 3 is a schematic side view of a vehicle driver and showing a light source and camera.

FIG. 3 schematically shows a light source 36. The light source 36 may comprise a near infrared (NIR) light source 38 and a diffractive optical element 40. The diffractive optical element 40 may be used to refract the NIR light emanating from the NIR light source 38 into a patten, and direct it at the vehicle driver 12. The NIR light may be directed to a vehicle driver's pupils, eyes or head, or all of these. In one implementation, the NIR light may be directed to the vehicle driver's eyes, including its pupil. FIG. 3 also shows a camera 42, preferably a near infrared camera 42 that detects the light reflected from the vehicle driver 12. The camera 42 may be located on the vehicle windshield on the top corner aligned to capture the face of the driver. It will be appreciated that the camera may be placed in any suitable location. The NIR camera 42 may monitor a vehicle driver's pupils to monitor for a change in the size and the position of the vehicle driver's pupil which may be indicative of a health anomaly, such as a seizure. In addition, the NIR light may be directed at the vehicle driver's head or eyes or both. A rapid change in head position or eye movement may also be indicative of a health anomaly, such as a seizure. Furthermore, long durations of the vehicle driver's eyelids being open or closed, eye gaze, blink duration and blink frequency may be indicative of a health anomaly, such as a seizure or loss of consciousness of the vehicle driver 12. The NIR camera 42 may continuously monitor any or all of the vehicle driver's pupil, eyes or head position. It will be appreciated that the NIR light source 38 and the NIR camera 42 may be placed at any suitable location in the vehicle, and preferably in a position that allows the NIR light to be directed to a vehicle user's eyes and head. The NIR camera 42 is coupled with the processor 54. The NIR camera 42 may generate a signal indicative of the vehicle driver's head position, eye, eye state, eyelid state and/or pupil size. The signal is provided to the processor 54.

FIG. 1 further schematically shows a galvanic skin response (GSR) sensor 43. The GSR sensor 43 may be used to monitor electrical change in the driver's skin. As shown, the GSR sensor 43 may be located on the vehicle steering wheel 20. Changes in the driver's skin electrical response may be indicative of a health anomaly, such as a seizure. The GSR sensor 43 is coupled with the processor 54. The GSR sensor 43 may generate a signal relating to the driver's skin electrical response which may be indicative of a medical abnormality. The signal is provided to the processor 54.

FIG. 1 schematically shows a steering angle sensor 44. The steering angle sensor 44 may be used to monitor the position of the steering wheel 20 The steering angle sensor 44 is used to monitor the vehicle driver's steering input. The steering angle sensor 44 may use LEDs placed in the steering column of a vehicle, although it will be appreciated, that any suitable steering angle sensor 44 may be used and may be located at any suitable location in the vehicle. The steering angle sensor 44 may be used to determine a vehicle driver's normal steering profile which may be stored by a memory in a normal profile logic 60 (shown in FIG. 5) in the vehicle. The steering angle sensor 44 may also be used in connection with detecting the health of a vehicle driver 12. In an implementation, the steering angle sensor 44 may detect frequent steering or severe angle deviations from arm movements. Frequent steering or severe angle deviations may be indicative of an anomaly of the vehicle driver's health, for example a seizure. The steering angle sensor 44 is coupled with the processor 54. The steering angle sensor 44 may generate a signal relating to the steering position of the steering wheel 20 which may be indicative of a medical abnormality. The signal is provided to the processor 54.

FIG. 1 also schematically shows a steering pressure sensor 46. The steering pressure sensor 46 may be used to monitor the grip pressure applied by the vehicle driver 12 to the steering wheel 20 or other steering input. It will be appreciated, that any suitable steering pressure sensor 46 may be used and may be located at any suitable location on the steering wheel 20. The steering pressure sensor 46 may be used to determine a vehicle driver's normal steering profile which may be stored by a memory in the normal profile logic 60 (FIG. 5) in the vehicle. The steering pressure sensor 46 may also be used in connection with detecting the health of a vehicle driver 12. In an implementation, the steering pressure sensor 46 may detect an increased pressure, e.g., a tight grip, as well as low or no steering pressure due to no contact or loss of contact by the vehicle driver 12 with the steering wheel 20. Larger pressures on the steering wheel 20 by the driver 12, or no contact by the vehicle driver 12 with the steering wheel 20 may be indicative of an anomaly of the vehicle driver's health, for example a seizure. The steering pressure sensor 46 is coupled with the processor 54. The steering pressure sensor 46 may generate a signal relating to amount of pressure that is applied to the steering wheel 20 by the vehicle driver 12. The applied to the steering wheel 20 which may be indicative of a medical abnormality. The signal is provided to the processor 54.

FIG. 1 schematically shows a photoplethysmogram (PPG) sensor 47. The PPG sensor 47 may be located in the steering wheel 20. The PPG sensor 47 may be used to monitor a driver's cardiac rate or rhythm. The PPG sensor 47 uses light transmitted to the driver 12 and reflected back. While the PPG sensor 47 is shown in the steering wheel, 20, it will be appreciated that the PPG sensor 47 may be located in any suitable position in a vehicle. Changes in the driver's cardiac rhythm may be indicative of a health anomaly, such as a heart attack. The PPG sensor 47 is coupled with the processor 54. The PPG sensor 47 may generate a signal relating to the cardiac rhythm of the vehicle driver 12 which may be indicative of a medical abnormality. The signal is provided to the processor 54.

FIG. 1 also schematically shows an accelerator pedal position sensor 48. The accelerator pedal position sensor 48 may be used to monitor the position of the accelerator pedal 22. It will be appreciated, that any suitable accelerator pedal position sensor 48 may be used. The accelerator pedal position sensor 48 may be used in connection with detecting the health of a vehicle driver 12. The position of the accelerator pedals 22, for example if the pedal is moved fully to the vehicle floor or frequent or sever accelerator position changes. may be indicative of an anomaly of the vehicle driver's health, for example a seizure. The accelerator pedal position sensor 48 is coupled with the processor 54.

The accelerator pedal position sensor 48 may generate a signal relating to the position of the accelerator pedal 50. The signal is provided to the processor 54.

FIG. 1 also schematically shows an accelerator pedal pressure sensor 50. The accelerator pedal pressure sensor 50 may be used to monitor the pressure applied by the vehicle user to the accelerator pedal 22. It will be appreciated, that any suitable accelerator pedal pressure sensor 50 may be used. The accelerator pedal pressure sensor 50 may be used in connection with detecting the health of a vehicle driver 12. In an implementation, the accelerator pedal pressure sensor 50 may detect an increased pressure, e.g., pushing the accelerator pedal 22 with high force to the vehicle floor, as well as no contact by the vehicle driver on the accelerator pedal. Larger pressures on the accelerator pedal 22 by the vehicle driver 12, or no contact by the vehicle driver 12 with the accelerator pedal 22 may be indicative of an anomaly of the vehicle driver's health, for example a seizure. The accelerator pedal position sensor 48 is coupled with the processor 54. The accelerator pedal pressure sensor 50 may generate a signal relating to the force applied by the vehicle driver 12 to the accelerator pedal 22. The signal is provided to the processor 54.

Figure 5:
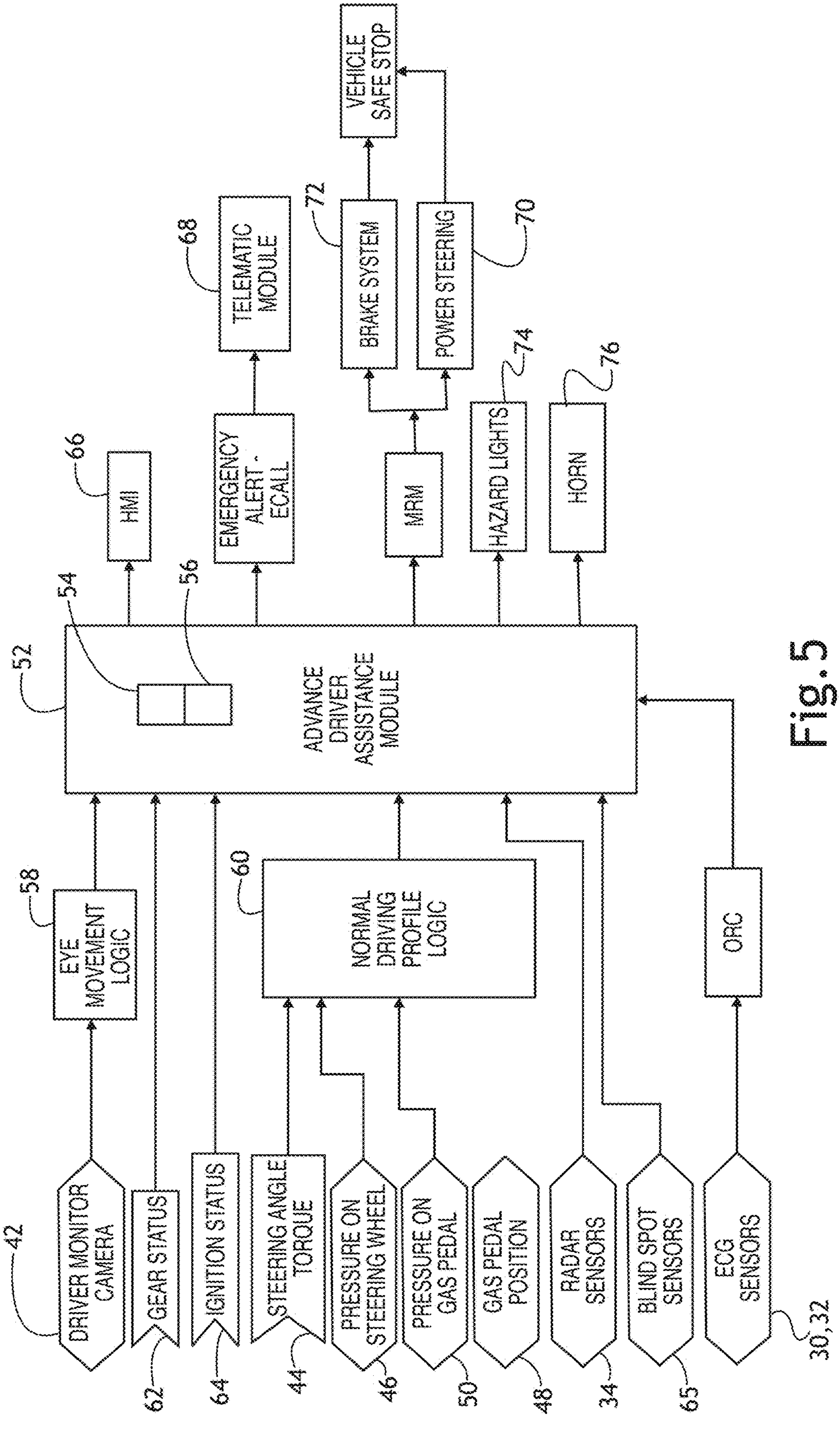
FIG. 5 is a diagram showing a system architecture.

FIG. 5 shows an implementation of a system architecture in connection with a driver health monitoring system 10. The system 10 includes an advanced driver assistance system or module 52. In an implementation, the advanced driver assistance module 52 includes a processor 54 (shared, dedicated, or group) and memory 56 that executes one or more software or firmware programs. The advance driver assistance module 52 may comprise input signal processing and filtering to enable accurate sampling and conversion or acquisitions of such signals from the various sensors. In other implementations, the driver assistance module may refer to one or more processing circuits such as an application specific integrated circuit (ASIC), an electronic circuit, a combinational logic circuit, and/or other suitable components that provide the described functionality.

The memory 56 can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

The driver assistance module 52, and, in certain implementations, the processor 54 is coupled or communicated with the various sensors and other components described above. As shown in FIG. 5, the camera 42 is coupled with the driver assistance module 52, and more specifically the processor 54. The signal generated by the camera 42 that is indicative of the vehicle driver's head, eye, eyelid and/or pupil size is coupled with the processor 54. It will be appreciated that in some implementations, the signal generated by the camera 42 will be processed by an eye movement logic 58. The eye movement logic may comprise an eye movement processor and memory. Each of the eye movement processor and memory may be of the type described above in connection with the advance driver assistance module. In this implementation, the eye movement logic 58 may generate an output signal that is coupled with the processor 54. It will further be appreciated that while named herein as an eye movement logic 58, the eye movement logic 58 also processes the signal related to the vehicle driver's head position, eyelid position and/or pupil size and position, or any other parameter monitored by the camera 42. It will further be appreciated that as used herein, "coupled with" also describes the situation where the signal generated by the respective sensor is ultimately provided to the processor 54, notwithstanding that the signal from the respective sensor may, in some instances, be received by an intermediate processor or logic and may undergo intermediate processing.

As shown in FIG. 5, the UWB unit 34 is coupled with the advanced driver assistance module 52, and more specifically with the processor 54. The UWB unit 34 generates a signal that is indicative of the vehicle driver's breathing or respiration. The signal generated by the UWB is provided to the processor 54.

As further shown in FIG. 5, the ECG sensors 30, 32 are coupled with the advanced driver assistance module 52 and more specifically with the processor 54. The signal generated by the ECG sensor 30 is indicative of the electrical activity of the vehicle driver's heart. In an implementation, the ECG sensor 30 may be coupled with the advanced driver assistance module 52 through an occupant restraint controller (ORC) 49. The ORC 49 may include an ORC processor and an ORC memory, which processor and memory may be of the type described above. In this implementation, the ORC 49 may provide intermediate processing of the signal from the ECG sensors 30, 32 and then provide a resultant signal indicative of the electrical activity of the vehicle driver's heart to the processor 54.

The system 10 may also include the normal driving profile module or logic 60. The normal driving profile logic 60 may comprise a normal driving processor and memory, and monitors and processes signals from a variety of sensors to establish a normal operating profile for vehicle drivers 12. Sensors that may provide signals to the normal driving profile logic 60 may include the steering angle sensor 44, the steering pressure sensor 46, the accelerator pedal position sensor 48 and the accelerator pedal pressure sensor 50. In an implementation, the normal driving profile module 60 may generate a signal to be provided to the advance driver assistance module 52. The normal driving profile logic may also process the signals from the respective sensors and determine that an anomaly has occurred. The normal driving profile logic 60 may then generate a signal indicative of the anomaly and provide the signal to the advance driver assistance module 52. In another implementation, the normal driving profile logic 60 may just pass the through the signals from the steering angle sensor 44, the steering pressure sensor 46, the accelerator pedal position sensor 48 and the accelerator pedal pressure sensor 50. This allows the processor 54 to make a determination regarding an anomaly in any of the signals received. In yet another implementation, the signals generated by the steering angle sensor 44, the steering pressure sensor 46, the accelerator pedal position sensor 48 and the accelerator pedal pressure sensor 50 may be provided directly to the advance driver assistance module 52, and to the processor 54 without providing the signals to a normal driving profile logic 60.

Other vehicle sensors may be provided which generate signals and provide them to the advance driver assistant module 52. For example, a signal of the gear status 62 and a signal of the ignition status 64 may be provided to the advance driver assistant module 52 which signals are indicative of the particular gear mode the vehicle is in and the state of the vehicle ignition, respectively. Further, a blind spot sensor 65 may be provided which also may also send a signal to the advance driver assistant module 52 indicative of an object in the vehicle's blind spot.

The advance driver assistance module 52 may send signals to other various vehicle components which signals may control the other components to take an action. The advance driver assistance module 52 may send signals to a human machine interface (HMI) 66 The HMI may be a module, by way of non-limiting example, the HMI may be a vehicle infotainment module. The HMI module 66 may be used to receive a signal from the advance driver assistance module 52, and in many implementations, the processor 54 that is indicative of an anomaly in the vehicle driver's health. The HMI module 66 may then provide a visual indication and audible indication, within the vehicle that an anomaly in the vehicle driver's health has been detected. Such an indication gives the vehicle driver 12 an opportunity to interact with the HMI module 66 to provide an indication that the vehicle driver does not have a health issue.

In the event that a vehicle driver 12 does not respond with the HMI module, indicating an anomaly, the advance driver assistance module 52, and in many implementations, the processor 54, may generate one or more signals to control various systems in the vehicle. The advance driver assistance module 52 may send a signal to the vehicle's telematic module 68 to initiate an emergency alert call or ECALL. The ECALL may be used to alert an operator that a vehicle driver 12 had a health anomaly.

The advance driver assistance module 52 may send a signal to initiate a minimum risk maneuver. In an implementation, if the advance driver assistance module 52 has detected an anomaly in a vehicle driver's health, the advance driver assistance module 52 may send a signal to one or both of the vehicle power steering system 70 and the vehicle brake system 72. This, in turn, may result in the vehicle coming to a safe stop, or to maneuver to a different location and then safely stop. This may be particularly beneficial when the vehicle operator has suffered a health anomaly, such as a seizure.

The advance driver assistance module 52 may send a signal to a turn on the vehicle hazard lights 74 or to sound the vehicle horn 76. In this way, surrounding vehicles or pedestrians may be visually and audibly altered, respectively to a problem within the vehicle signaling.

While a system architecture has been discussed above, it will be appreciated that the system architecture could be modified, such as by eliminating or consolidating various of the sensor, modules or devices. Furthermore, not every one of the sensors or respective modules may be necessary for a given implementation. Similarly, it may not be necessary for the advance driver assistance module 52 to provide signals to each of the systems or components described above.

Figure 4:
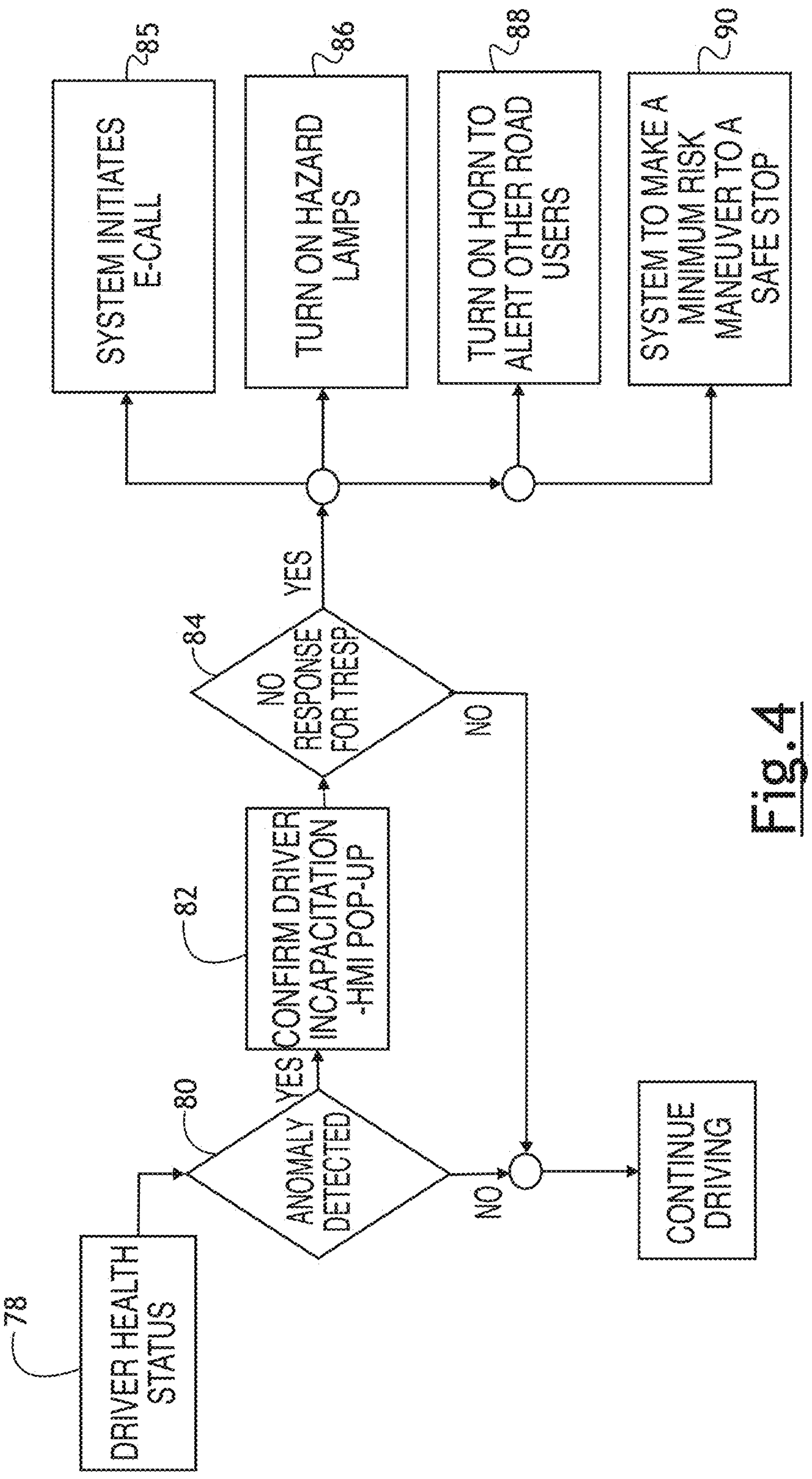
FIG. 4. is a flow diagram.

FIG. 4 shows a flowchart of a method that may be used in connection with the driver health monitoring system. In block 78, the system 10 monitors a driver's health status. The driver's health status may be monitored by monitoring at least one of a driver's pupil size, position, a driver's eye position, a driver's eyelid position or a driver's head position using the light source 36 and a camera 42 and providing a signal indicative of the driver's pupil size of the driver's eye position from the camera to the processor 54. Additionally, or alternatively, the driver's health status may be monitored by monitoring the cardiac rhythm of a driver using an ECG sensor 30 or a PPG sensor 47, or both coupled with the processor 54 and providing a signal indicative of the driver's cardiac rhythm from the ECG sensor 30 or the PPG sensor 47 to the processor 54.

In certain implementations, the system 10 may also monitor the vehicle driver's health by monitoring the respiration of the vehicle driver using the ultra-wide band radar, e.g., UWB unit 34 The UWB unit may thus be used to detect the breathing activity of the vehicle driver 12. The UWB unit 34 is coupled with the processor 54 and generates a signal indicative of the vehicle driver's breathing which signal is received by the processor 54.

In certain implementation, the system 10 may also monitor the vehicle driver's health status by using any or all of the steering angle sensor 44, the steering pressure sensor 46, the accelerator pedal position sensor 48 or the accelerator pedal pressure sensor 50. The sensors 44, 46, 48 and 50 provide signals to the processor 54 indicative of the steering wheel 20 position, any force applied by the vehicle driver 12 to the steering wheel 20, the accelerator pedal 22 position and any force applied to the accelerator pedal, respectively. As set forth above, these signals may be indicative of the state of a vehicle driver's health.

It will be appreciated that as set forth herein, the signals from the various sensors are received by the processor 54, whether or not they undergo intermediate processing. The signals may be received directly from the various sensors, or the signals may be received from other logic or modules. In certain implementations, the signals from the sensors may first be processed by other processors or logic.

In block 80, the processor 54 carries out instructions stored in the memory 56 to determine whether an anomaly in the vehicle driver's health exists. If no anomaly is found, operation of the vehicle continues. In the event that a health anomaly is detected, the processor 54 generates a signal indicating the detection of the health anomaly and the signal from the processor 54 is received by the HMI 66, as shown in block 82.

Upon receipt of a signal indicating determination of a health anomaly, the HMI 66 alerts the driver, both audibly and visually that the system 10 has detected an anomaly. The HMI will query the vehicle driver 12 about the vehicle driver's health status. The query may ask the driver for information as to whether the vehicle driver is healthy, is suffering a health emergency or is incapacitated. The vehicle driver, if not incapacitated, can interact with the HMI to provide an input to the system 10 that the vehicle driver is not having an incapacitating health issue. As shown in block 84, the vehicle driver's interaction with the HMI 66 will result in continued normal driving of the vehicle. If, however, the vehicle driver 12 fails to respond to the query from the HMI 66, indicating the vehicle driver is incapacitated, or responds that the vehicle driver 12 is having a health emergency, the processor 54 generates a signal that is configured to perform the following tasks: initiate an emergency alert call, block 85, engage a vehicle's hazard lights action, block 86, sound a vehicle's horn, block 88, perform a minimum risk maneuver, block 90, by either engaging a vehicle's brake system, a vehicle's steering system, or both.

In some implementations, the ECG sensors 30,32 continuously monitor the ECG variations of the driver's heart for a cardiac event. If three consecutive waves are seen with irregularities, then the processor 54 will generate a signal and provide it to the HIM 66 which will alert the driver both visually and audibly to enter a response if the driver is not suffering a health anomaly. If the driver responds within a set time interval, for example 5 seconds that the driver is not suffering a health anomaly, by interacting with the HMI, then operation of the vehicle will continue as normal. If the driver does not respond within the time period, the processor 54 will generate a signal for sending to the advance driver assistance module 52 which may send a signal to the vehicle's telematic module 68 to initiate an emergency alert call or ECALL. The ECALL may be used to alert an operator that a vehicle driver 12 had a health anomaly and to identify the specific location of the vehicle. The processor 54 may also generate a signal to engage the vehicle's hazard lights action, block 86, sound a vehicle's horn, block 88, perform a minimum risk maneuver, block 90, by either engaging a vehicle's brake system, a vehicle's steering system, or both. If, after the initiation of the actions stated herein, the driver is able to recover and regain control of the vehicle, the driver can cancel the alerts and resume normal driving. Furthermore, ECG sensor 30, acting with UWB may provide better accuracy on detecting cardiac events.

In some implementations, the UWB sensor 34 may detect an abnormal breathing rate indicative of a cardiac event. In an implementation, an abnormal breathing rate not within the range of 10-20 breaths per minute when monitored for a time period, for example 3 to 5 minutes will result in the processor 54 generating a signal to be provided to the HMI 66. The HMI 66 will alert the driver both visually and audibly to enter a response if the driver is not suffering a health anomaly. If the driver responds within a set time interval, for example 5 seconds that the driver is not suffering a health anomaly, by interacting with the HMI, then operation of the vehicle will continue as normal. If the driver does not respond within the time period, the processor 54 will generate a signal for sending to the advance driver assistance module 52 which may send a signal to the vehicle's telematic module 68 to initiate an emergency alert call or ECALL. The ECALL may be used to alert an operator that a vehicle driver 12 had a health anomaly and to identify the specific location of the vehicle. The processor 54 may also generate a signal to engage the vehicle's hazard lights action, block 86, sound a vehicle's horn, block 88, perform a minimum risk maneuver, block 90, by either engaging a vehicle's brake system, a vehicle's steering system, or both. If, after the initiation of the actions stated herein, the driver is able to recover and regain control of the vehicle, the driver can cancel the alerts and resume normal driving. Furthermore, UWB sensor 34, acting with the ECG sensors 30,32 may provide better accuracy on detecting cardiac events.

In some implementations, the camera 42 may detect an abnormal pupil size, abnormal pupil position and/or abnormal position of the driver's head which may be indicative of a seizure, black out, gaze, or loss of consciousness. In an implementation, an abnormal change in pupil size or abnormal position of the pupil is detected when the head position of the driver is straight for more than a period of time, for example 5 seconds, or if the driver's head position is not straight for a time period, for example 5 seconds, and/or the driver's eyelids are closed for a period of time, for example more than 10 seconds, may be indicative of a driver health anomaly. Any one of these conditions will result in the processor 54 generating a signal to be provided to the HMI 66. The HMI 66 will alert the driver both visually and audibly to enter a response if the driver is not suffering a health anomaly. If the driver responds within a set time interval, for example 5 seconds that the driver is not suffering a health anomaly, by interacting with the HMI, then operation of the vehicle will continue as normal. If the driver does not respond within the time period, the processor 54 will generate a signal for sending to the advance driver assistance module 52 which may send a signal to the vehicle's telematic module 68 to initiate an emergency alert call or ECALL. The ECALL may be used to alert an operator that a vehicle driver 12 had a health anomaly and to identify the specific location of the vehicle. The processor 54 may also generate a signal to engage the vehicle's hazard lights action, block 86, sound a vehicle's horn, block 88, perform a minimum risk maneuver, block 90, by either engaging a vehicle's brake system, a vehicle's steering system, or both. If, after the initiation of the actions stated herein, the driver is able to recover and regain control of the vehicle, the driver can cancel the alerts and resume normal driving.

In some implementations, the steering angle sensor 44 or pressure sensor 46 may detect abnormal arm movements or grip which may be indicative of a seizure. In an implementation, a driver's normal driving profile is stored in the system 60. Too many variations in the driver's steering angle continuously for a time period, for example more than 5 seconds in comparison with the driver's normal profile may indicate a health anomaly such as a seizure. Similarly, if the driver releases the steering angle and the driver is not detected as having hands on the steering wheel for a period of time, for example more than 5 seconds may indicate a health anomaly such as a seizure. Also, an increase in pressure exerted by the driver on the steering wheel as detected by sensor 46 that higher than the driver's normal profile, or a complete release of pressure exerted by the driver for a period of time for example more than 5 seconds may also indicate a health anomaly such as a seizure. Any one of these conditions, abnormal arm movements or abnormal grip will result in the processor 54 generating a signal to be provided to the HMI 66. The HMI 66 will alert the driver both visually and audibly to enter a response if the driver is not suffering a health anomaly. If the driver responds within a set time interval, for example 5 seconds that the driver is not suffering a health anomaly, by interacting with the HMI, then operation of the vehicle will continue as normal. If the driver does not respond within the time period, the processor 54 will generate a signal for sending to the advance driver assistance module 52 which may send a signal to the vehicle's telematic module 68 to initiate an emergency alert call or ECALL. The ECALL may be used to alert an operator that a vehicle driver 12 had a health anomaly and to identify the specific location of the vehicle. The processor 54 may also generate a signal to engage the vehicle's hazard lights action, block 86, sound a vehicle's horn, block 88, perform a minimum risk maneuver, block 90, by either engaging a vehicle's brake system, a vehicle's steering system, or both. If, after the initiation of the actions stated herein, the driver is able to recover and regain control of the vehicle, the driver can cancel the alerts and resume normal driving.

In some implementations, the accelerator pedal position sensor 48 or accelerator pressure sensor 50 may detect abnormal pedal position or pressure on the pedal which may be indicative of a seizure. In an implementation, a driver's normal driving profile is stored in the system 60. A pedal that has been pushed to the floor as detected by pedal position sensor 48 or a pressure on the accelerator pedal that is greater than the drivers normal driving profile, which overrides the system's intervention to reduce speed due to objects on the road or the vehicle drifting from the lane may indicate a health anomaly such as a seizure. Additionally, while the vehicle is being driven and when the brake is not applied and the position of the accelerator pedal remains constant while there is no pressure on the accelerator pedal detected by the sensor 50 for a period of time, for example 5 seconds may indicate that the driver's foot has been removed from the accelerator pedal may indicate a health anomaly such as a seizure. Any one of these conditions, will result in the processor 54 generating a signal to be provided to the HMI 66. The HMI 66 will alert the driver both visually and audibly to enter a response if the driver is not suffering a health anomaly. If the driver responds within a set time interval, for example 5 seconds that the driver is not suffering a health anomaly, by interacting with the HMI, then operation of the vehicle will continue as normal. If the driver does not respond within the time period, the processor 54 will generate a signal for sending to the advance driver assistance module 52 which may send a signal to the vehicle's telematic module 68 to initiate an emergency alert call or ECALL. The ECALL may be used to alert an operator that a vehicle driver 12 had a health anomaly and to identify the specific location of the vehicle. The processor 54 may also generate a signal to engage the vehicle's hazard lights action, block 86, sound a vehicle's horn, block 88, perform a minimum risk maneuver, block 90, by either engaging a vehicle's brake system, a vehicle's steering system, or both. If, after the initiation of the actions stated herein, the driver is able to recover and regain control of the vehicle, the driver can cancel the alerts and resume normal driving.

What is claimed is:

1. A vehicle driver health monitor and alert system, comprising:

a light source configured to direct light to at least one of a driver's eyes or a driver's head;

a camera to detect reflected light from the light source and configured to generate a signal indicative of a position of at least one of a driver's pupil size, position, eye position or head position;

an ultra-wide bandwidth unit configured to direct ultra-wide bandwidth radar pulses at a vehicle driver, to receive reflections from a driver to monitor a driver's breathing, and to generate a signal indicative of a driver's breathing; and a processor configured to receive the signal from the camera and to make a determination regarding the position of at least one of a driver's pupil size, pupil or eye position or head position and is further configured to make a determination regarding a health status of a driver as a function of at least one of the driver's pupil size, pupil position, eye position or head position, wherein the processor is configured to, upon a determination of an anomaly in a driver's health status, generate a signal to perform one or more of the following tasks, initiate an emergency alert call, sound a vehicle's horn, engage a vehicle's hazard lights, perform a minimum risk maneuver, wherein the processor is further configured to receive the signal from the ultra-wide bandwidth unit, make a determination regarding a driver's breathing; and make a determination regarding the health status of a driver as a function of the driver's breathing, wherein the processor is configured to, upon a determination of an anomaly in a driver's health status, generate a signal to perform one or more of the following tasks; initiate an emergency alert call, sound a vehicle's horn, engage a vehicle's hazard lights, engage a vehicle's brake system, or engage a vehicle's steering system.

2. The system of claim 1 further comprising a galvanic skin response sensor and to generate a signal indicative of a driver's skin electrical charges and the processor is configured to:

receive the signal from the galvanic skin response sensor;

make a determination regarding a driver's skin electrical charges; and make a determination regarding the health status of a driver, wherein the processor is configured to, upon a determination of an anomaly in a driver's health status, generate a signal to perform one or more of the following tasks, initiate an emergency alert call, sound a vehicle's horn, engage a vehicle's hazard lights, perform a minimum risk maneuver.

3. The system of claim 1 further comprising at least two ECG sensing electrodes configured to contact a vehicle driver for monitoring a driver's cardiac rhythm, and the at least two ECG sensing electrodes generate a signal indicative of a driver's heart rhythm, and the processor is configured to:

receive the signal from the at least two ECG sensing electrodes;

make a determination regarding a driver's heart rhythm; and make a determination regarding the health status of a driver, wherein the processor is configured to, upon a determination of an anomaly in a driver's health, generate a signal to perform one or more of the following tasks; initiate an emergency alert call, sound a vehicle's horn, engage a vehicle's hazard lights, engage a vehicle's brake system, or engage a vehicle's steering system.

4. The system of claim 3 wherein at least one of the ECG sensing electrodes is a ground electrode.

5. The system of claim 1 further comprising a photoplethysmogram sensor for monitoring a driver's cardiac rhythm, and to generate a signal indicative of a driver's cardiac rhythm, and the processor is configured to:

receive the signal from the photoplethysmogram sensor, make a determination regarding a driver's heart rhythm; and make a determination regarding the health status of a driver, wherein, the processor is configured to, upon a determination of an anomaly in a driver's health, generate a signal to perform one or more of the following tasks; initiate an emergency alert call, sound a vehicle's horn, engage a vehicle's hazard lights, engage a vehicle's brake system, or engage a vehicle's steering system upon detection of an anomaly in a driver's health status based on cardiac rhythm.

6. The system of claim 1 further comprising a steering angle sensor adapted to be coupled with the processor and adapted to provide a signal indicative of the position of a steering wheel to the processor.

7. The system of claim 6 further comprising a steering wheel pressure sensor adapted to be coupled with the processor and adapted to provide a signal indicative of the pressure applied by a driver to the steering wheel pressure sensor.

8. The system of claim 1 further comprising an accelerator pedal position sensor adapted to be coupled with the processor and adapted to provide a signal indicative of the position of an accelerator pedal to the processor.

9. The system of claim 8 further comprising an accelerator pedal pressure sensor adapted to be coupled with the processor and adapted to provide a signal indicative of the pressure applied by a user to the accelerator pedal to the processor.

10. The system of claim 1 wherein the light source comprises a near infrared laser and a diffracted optical element.

11. The system of claim 1 further comprising an advanced driver assistance system containing the processor.

12. The system of claim 11 further comprising a human machine interface configured to be accessible to a driver, the human machine interface is configured to receive a signal from the processor indicative of an anomaly in a driver's health and is further adapted to alert a driver that an anomaly has been detected.

13. A method of monitoring a vehicle driver's health and providing an alert, comprising:

monitoring at least one of a driver's pupil size, a driver's eye position, or a driver's head position using a light source and a camera and providing a signal indicative of at least one of a driver's pupil size, a driver's eye position, or a driver's head position from the camera to a processor;

monitoring with a galvanic skin response sensor a conductivity of the driver's skin;

monitoring the breathing of a driver using an ultra-wide bandwidth radar sensor;

determining a health status of the vehicle driver as a function of the pupil size, eye position, head position, electrical charges and breathing, and generating a signal indicative of the vehicle driver's health status when an anomaly in the vehicle driver's health is detected regarding one or more of the pupil size, eye position, head position, skin conductivity and breathing;

sending a signal to a human machine interface indicative of the anomaly of the vehicle driver's health;

monitoring the human machine interface for a response from the driver; and initiating an emergency alert call when the driver does not respond within a threshold time.

14. The method of claim 13 further comprising, upon detection of an anomaly in a driver's health status, generating signal to perform one or more of the following tasks: sound a vehicle's horn, engage a vehicle's hazard lights, or perform a minimum risk maneuver.

15. The method of claim 14 wherein the minimum risk maneuver comprises at least one of engaging a vehicle brake system or engaging a vehicle steering system to bring a vehicle to a safe stop.

16. The method of claim 13 further comprising monitoring the cardiac rhythm of a driver using at least one of an ECG sensor or a photoplethysmogram sensor and determining the health status of the vehicle driver based on the cardiac rhythm of the driver.

* * * * *